350-377 SR
XR 3,734,625
1X 4030W

United Stat

Aagard

[11] 3,734,625

[45] May 22, 1973

[54] READOUT SYSTEM FOR A MAGNETO-OPTIC MEMORY

[75] Inventor: Roger L. Aagard, Minneapolis, Minn.

[73] Assignee: Honeywell Inc., Minneapolis, Minn.

[22] Filed: Dec. 23, 1971

[21] Appl. No.: 211,540

Related U.S. Application Data

[63] Continuation-in-part of Ser. No. 857,308, Sept. 12, 1969, Pat. No. 3,631,415.

[52] U.S. Cl. .................................... 356/118, 350/151
[51] Int. Cl. ............................................ G01n 21/40
[58] Field of Search ................ 340/174.1 M, 174 YC; 356/114, 118; 350/150, 151, DIG. 1, DIG. 2

[56] References Cited

UNITED STATES PATENTS

| | | | |
|---|---|---|---|
| 3,403,262 | 9/1968 | Seidel | 350/DIG. 2 |
| 3,430,212 | 2/1969 | Max et al. | 340/174 YC |
| 3,651,504 | 3/1972 | Goldberg et al. | 340/174.1 M |

*Primary Examiner*—Edward S. Bauer
*Attorney*—Lamont B. Koontz et al.

[57] ABSTRACT

An optical mass memory utilizing the Curie point writing technique wherein information is stored on a manganese bismuth film. A laser beam provides thermal energy to a predetermined film spot to achieve Curie point writing. The stored information is retrieved utilizing the polar Kerr magneto-optic effect.

2 Claims, 2 Drawing Figures

3734625
OR IN 356/369

READOUT SYSTEM FOR A MAGNETO-OPTIC MEMORY

REFERENCE TO RELATED APPLICATIONS

This application is a continuation-in-part of a co-pending patent application Ser. No. 857,308 filed Sept. 12, 1969, to be issued Dec. 28, 1971 as U.S. Pat. No. 3,631,415, by Roger L. Aagard, Di Chen, and Francis M. Schmit entitled OPTICAL MASS MEMORY, which is assigned to the same assignee as the present invention.

BACKGROUND OF THE INVENTION

The present invention relates to a method and system for storing information. More particularly, the present invention relates to a method and system for optically storing information on a magnetic film having a plurality of temperature dependent crystallographic phases.

Recently, a number of applications have arisen for large capacity, random access, mass storage devices. Some applications, such as the recording of high resolution video information, require a very large storage capacity on the order of $10^{10}$ to $10^{12}$ bits of information. In general the mass storage devices currently used, such as drums, disc files, magnetic card devices, and tape loop units, encounter serious problems in reliability, power consumption and size when these devices approach a storage capacity of $10^9$ bits or larger. A desirable alternative to the utilization of such electromechanical devices has been the recent development of optical information systems. Such systems are commonly referred to as optical mass memories.

The most advantageous optical information storage scheme utilizes a laser to provide Curie point writing. Such a scheme was disclosed and claimed in U.S. Pat. No. 3,368,209 to L. D. McGlauchlin et al. and assigned to the same assignee as the present invention.

SUMMARY OF THE INVENTION

The magneto-optic system of the present invention detects the magnetic alignment of predetermined spots on a magnetic medium by the magneto-optic Kerr effect. The light beam source projects a polarized light beam along a first path. The magnetic medium is positioned to receive the light beam at essentially normal incidence. The polarization direction of the light beam is rotated and the light beam is reflected back toward the light beam source over essentially the first path. Polarizing beam splitter means is located between the light beam source and the magnetic medium. The polarizing beam splitter means is oriented to pass that portion of the projected and reflected light beam having a first polarization direction. Polarizing beam splitter means directs over a second path a component of a light beam having a polarization direction different from the first polarization direction. The component directed over the second path has a first intensity when the predetermined spot has an anti-parallel magnetic vector alignment and the second intensity when the predetermined spot has a parallel vector alignment. First light detector means receives the light component directed over the second path.

DETAILED DESCRIPTION OF THE PREFERRED EMBODIMENTS

For purposes of this invention, a magnetic media is any ferromagnetic or ferrimagnetic material. The Curie point associated with the magnetic media is that temperature at which the material loses its magnetization. Whereas the present invention includes all magnetic media, for purposes of convenience, the discussion hereinbelow is limited primarily to manganese bismuth.

Figure 1:
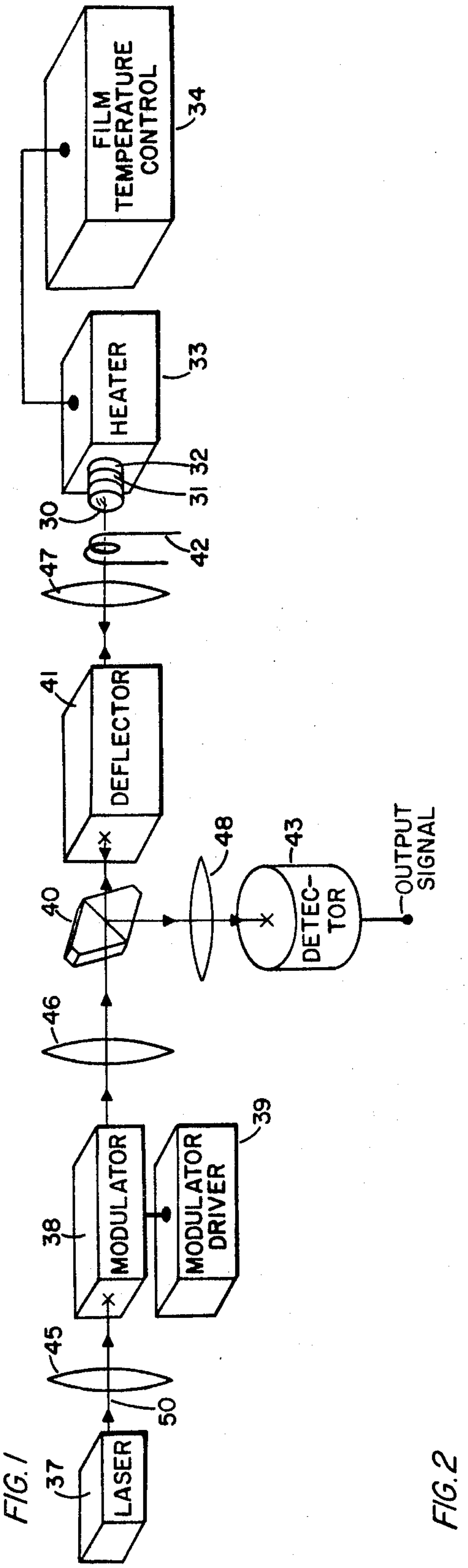
FIG. 1 is a diagrammatical illustration of a preferred embodiment of the present invention.

FIG. 1 illustrates a preferred embodiment of an optical mass memory for providing both information recording and retrieval. In this embodiment, information is stored on MnBi film 30. Film 30 is deposited in a conventional manner on a glass substrate 31. Mica and other similar materials can also be utilized as a substrate medium. In physical contact with substrate 31 is a metallic heat conductor 32. A metal with good heat conduction properties, such as aluminum, is utilized. As shown, heat conductor 32 is of substantially the same shape as substrate 31. An electrical resistance heater 33 provides heat to conductor 32 which in turn distributes the heat uniformly through substrate 31 to film 30. In a preferred embodiment, film 30 is maintained in a preheated temperature of approximately 200° C. A temperature, such as 200° C, which is just above the quenched high-temperature phase Curie point is preferred since it maximized the power range of the laser beam which can be utilized for "reading-out" information stored in a conditioned portion of the film without raising the film temperature above the low-temperature phase Curie point. As a result of utilizing a maximized laser beam intensity level in the read stage of operation, a maximized read output signal is obtained. A MnBi film of approximately 6 inches in diameter can be uniformly maintained at 200° C using a conventional electric heater. The power requirements of the heater varies, of course, with the design of the film holder. Film temperature control means 34 is utilized to control the amount of thermal energy heater 33 transmits to heat conductor 32. Any conventional temperature sensitive device such as a thermocouple or thermistor can be utilized.

The optical mass memory illustrated in FIG. 1 further includes a HeNe laser 37; a light modulator 38 and a modulator driver 39; a polarizing beam splitter 40; an E-O light beam deflector 41; means 42 for applying a magnetic field to film 30; a light responsive detector 43, and light focusing means 45, 46, 47 and 48. Laser 37 has a power output of less than 50 milliwatts. Light modulator 38 is a conventional electro-optic (E-O) modulator. For example, the modulating capabilities of $LiNbO_3$ and KDP are well-known in the art. If a modulator such as a TFM 512 KDP modulator manufactured by the Isomet Corporation is used, focusing lenses 45 and 46 are no longer necessary. Polarizing beam splitter 40 is a conventional polarizing beam splitter such as a Model 328 polarizing beam splitter manufactured by Spectra Physics Corporation. Deflector 41 provides light beam deflection in either of two directions. Such two-dimensional light beam deflectors are well-known in the art. See, for example, "Bright Hopes for Display Systems; Flat Panels and Light Deflectors" by R. A. Soraf and D. H. McMahon appearing in Electronics, Pages 56– 62, Nov. 29, 1965. Means for applying a magnetic field to film 30 need only be a single loop coil as illustrated. Detector 43 is a conventional high frequency response photo detector. Focusing means 45, 47 and 48 are converging lenses having focal lengths dictated by the various spacings between the components of the information storage system. Focusing lens 46 is a collimating lens.

In operation, heater 33 generates sufficient thermal energy to maintain MnBi film 30 at a temperature in the neighborhood of 200° C. The actual temperature of film 30 is determined by control means 34 and any necessary temperature correction can be made either electronically or manually. To record or "write" information on MnBi film 30, thermal energy from plane polarized laser 50 is required to heat the film from 200° C to a temperature above the low-temperature phase Curie point (360° C). However, before incidence on film 30, beam 50 is focused by lens 45 onto modulator 38 and collimated by lens 46 after passing unimpeded through modulator 38. The collimated, plane polarized beam then traverses unimpeded through polarizing beam splitter 40 and is incident on E-O deflector 41. Deflector 41 deflects light beam 50 to a predetermined portion of MnBi film 30 in response to an applied electric field. Finally, deflected beam 50 is focused to a spot of approximately 1 to 2 micrometers on film 30 in the focal plane of lens 47. Upon incidence on film 30, beam 50 heats the predetermined spot above the 360° C Curie point. With a Gaussian beam having a radius at the $1/e^2$ intensity level on the order of 4 micrometers, spots 1–2 micrometers in diameter can ordinarily be heated above the Curie point using micro-second duration laser pulses with less than 50 milliwatt beam power. Above the Curie temperature, the heated spot loses its magnetization. After exposure of the spot to a laser pulse sufficient to heat it above the low-temperature phase Curie point, beam 50 is reduced in intensity by modulator 38 and switched to another portion of the film by deflector 41. The heated spot then cools through the low-temperature phase Curie point returning to its quiescent stage operating temperature of 200° C. Upon cooling, the portion becomes magnetized in either a direction parallel or anti-parallel to the magnetization direction of the surrounding film. Orientation of the spot's magnetization direction is dependent upon the existing net magnetic field. Normally, the closure flux of the surrounding film area is sufficient to align the magnetic vector of the spot in a direction anti-parallel to the magnetization direction of the surrounding area. However, the closure flux of the surrounding area can be aided by an externally applied magnetic field such as could be provided by coil 42.

By heating predetermined portions of the film 30 above the low-temperature phase Curie point in a spot-by-spot manner, digital information is written or recorded on the film. It has been theoretically found that a 20 percent cumulative temperature rise occurs when the sports are heated above the Curie point at a rate of 100 kiloHertz. Since a write-erase cycling rate of an individual bit greater than 100 kiloHertz is not normally required in an optical mass memory, maintaining film 30 at a quiescent phase operating temperature of 200° C will not result in a cumulative heating effect so as to raise the film above the low-temperature phase Curie point.

As illustrated, information stored on MnBi film 30 is read-out utilizing the polar magneto-optic Kerr effect. Retrieval of the stored information is achieved by activating modulator 38 to attenuate the intensity of the laser beam to the extent that no appreciable temperature rise occurs when film 30 is exposed to the incident beam. A field of the proper magnitude applied to modulator 38 by modulator driver 39 achieves the desired attenuation. Upon incidence on a preselected spot of film 30, the polarized direction of plane polarized beam 50 is rotated in a direction dependent upon the magnetization direction of the spot. Approximately 40 percent of laser beam 50 is then reflected by film 30 back along the path of incidence and is again incident upon the polarizing beam splitter 40. For purposes of this specification, assume that polarizing beam splitter 40 reflects a first intensity toward detector 43 when the polarization direction of beam 50 is rotated in a direction corresponding to an anti-parallel magnetic vector alignment of the preselected spot and a second intensity when the polarization direction is rotated in a direction corresponding to a parallel magnetic vector alignment. Thus, the magnitude of the signal generated by detector 43 is indicative of the preselected spot's magnetization direction. In this manner, retrieval of the information stored in film 30 is achieved.

The intensity of the component reflected to detector 43 is different for parallel and anti-parallel spots because the effective beam diameter of the read out beam is larger than the diameter of the recorded spot. In other words, the read out beam intercepts the spot plus a portion of the surrounding film. A total magneto-optic rotation is produced by the spot plus the portion of the surrounding film. The total magneto-optic rotation of the surrounding film plus a spot having an anti-parallel magnetic vector alignment is less than the total magneto-optic rotation of the surrounding film plus a spot having a parallel magnetic vector alignment. For example, the "Kerr component" produced by a 1–2 micrometer anti-parallel spot within a 4 micrometer read beam is less than the Kerr component produced by a parallel spot. Polarizing beam splitter 40 reflects the Kerr component to detector 43. It is in this manner that a first intensity is directed toward detector 43 when a spot having an anti-parallel magnetic vector alignment is read and a second, greater intensity is directed to detector 43 when a spot having parallel magnetic vector alignment is read.

Erasure of the stored information is obtained by heating a selected portion of the film above the low-temperature phase Curie point and cooling in the presence of an external magnetic field provided by field generating means 42. An erasure field in the order of 500 Oersteds is ordinarily sufficient to restore a spot of approximately 2 micrometers diameter to its original magnetization direction. Since during the quiescent stage of operation the thermal energy provided by heater 33 maintains film 30 at a temperature (200° C) at which only the low-temperature phase can exist, the high-temperature crystallographic phase is never retained by film 30 upon cooling below the Curie point during either writing or erasing. Thus, as stated previously, the present invention provides a completely reversible write-erase cycle.

The magneto-optic read out system shown in FIG. 1 has one disadvantage. Fluctuations in the output of laser 37 appear as noise in the output signal. To enhance the signal-to-noise characteristics of the read out system of FIG. 1, an additional beam splitter 60 is added in FIG. 2. Beam splitter 60 is preferably an ordinary beam splitter or a polished piece of glass which is oriented at an angle much greater than its Brewster angle. Beam splitter 60 directs a small portion of light beam 50 after reflection from magnetic film 30 to second detector 63. Detector 63 produces a signal indicative of the intensity of the portion of the light received. The signals from detector 43 and detector 63 are directed to a differential amplifier 65 which produces an output signal indicative of the difference of the signals from the detectors.

Figure 2:
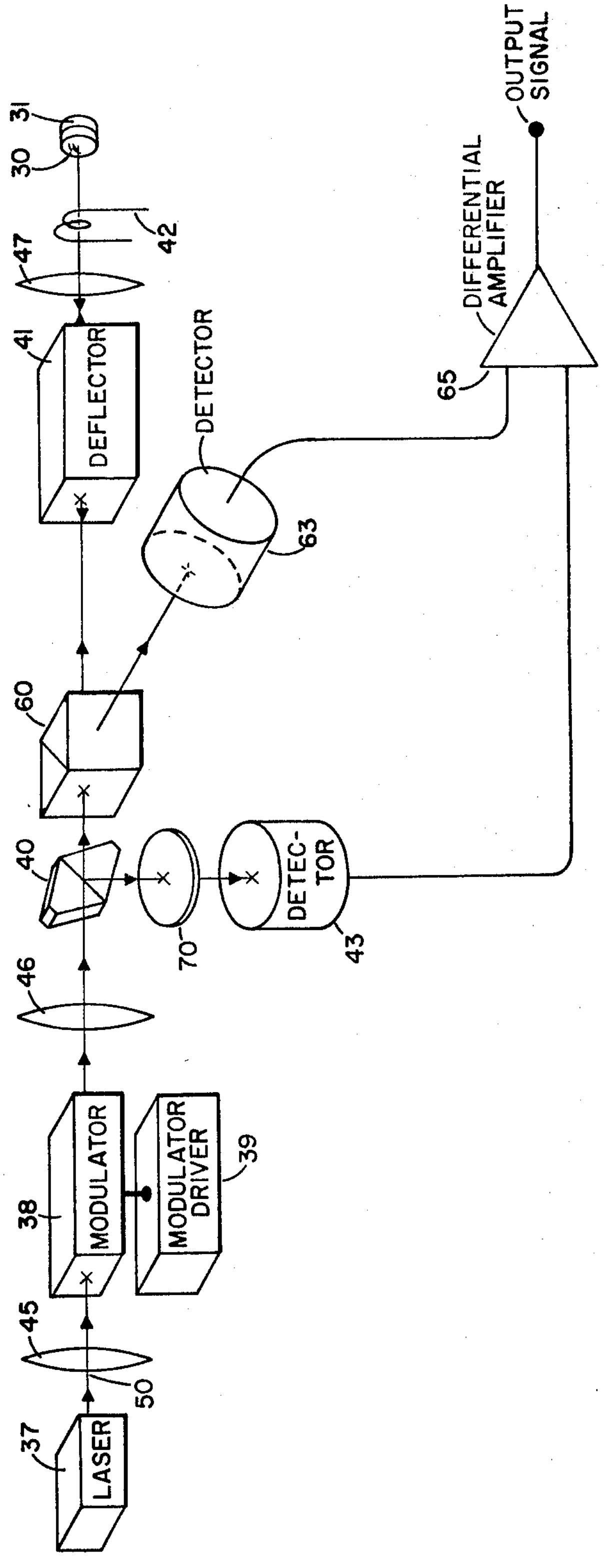
FIG. 2 is a diagrammatical illustration of another embodiment of the present invention utilizing differential detection.

As shown in FIG. 2, beam splitter 60 is preferably oriented such that the portion of the light beam directed to detector 63 is essentially orthogonal to the portion of the light beam directed to detector 43. This minimizes the effect of the magneto-optic rotation upon the signal produced by detector 63. The portion directed to detector 63 is a small percent of the total light beam 50.

It should be noted that in FIG. 2, heater 33 and film temperature control 34 have not been shown. The magneto-optic read out system of the present invention does not depend upon the control of the temperature of the magnetic medium. The operation of the system of the present invention is equally applicable to a room temperature system utilizing manganese bismuth film or any other suitable magnetic medium.

It should further be noted that an analyzer 70 is added between polarizing beam splitter 40 and detector 40 to improve the extinction ratio of polarizing beam splitter 40.

While this invention has been particularly shown and described with reference to a preferred embodiment thereof, it will be understood by those skilled in the art that changes in form and detail may be made therein without departing from the scope and spirit of the invention. This is particularly true in relation to the construction and arrangement of the optical elements for providing light beam deflection, modulation and focusing.

The embodiments of the invention in which an exclusive property or right is claimed are defined as follows:

1. A system for detecting, by the magneto-optic Kerr effect, the magnetic alignment of predetermined spots on a magnetic medium, the system comprising:

a light beam source for projecting a polarized light beam along a first path;

the magnetic medium positioned to receive a light beam at essentially normal incidence and to rotate the polarization direction of the light beam and reflect the light beam back toward the light beam source over essentially the first path;

polarizing beam splitter means located between the light beam source and the magnetic medium, the polarizing beam splitter means being oriented to pass that portion of the projected and reflected light beam having a first polarization direction, and to reflect over a second path a component of the light beam having a polarization direction different from the first polarization direction, the component directed over the second path having a first intensity when the predetermined spot has an anti-parallel magnetic vector alignment and a second, different intensity when the predetermined spot has a parallel magnetic vector alignment;

first light detector means positioned to receive the component directed over the second path;

light deflector means located between the polarizing beam splitter means and the magnetic medium;

focusing means positioned between the light beam deflector means and the magnetic medium for focusing the light beam to a focused light spot at the magnetic medium; and modulator means positioned between the light beam source and the polarizing beam splitter means.

2. The system of claim 1 and further comprising beam splitter means positioned between the polarizing beam splitter means and the magnetic medium for reflecting a small portion of a light beam reflected from the magnetic medium over a third path;

second light detector means positioned to receive the portion of the light beam directed over the third path, and differential amplifier means for receiving signals from the first and second detector means and for producing an output signal indicative of the difference of the signals.

* * * * *